(12) United States Patent
Devasthali et al.

(10) Patent No.: US 10,389,669 B2
(45) Date of Patent: Aug. 20, 2019

(54) DETECTING AND INDICATING PARTIAL READ STATUS OF EMAILS BASED ON EMAIL CONTENTS

(71) Applicant: International Business Machines Corporation, Armonk, NY (US)

(72) Inventors: Snehal S. Devasthali, Pune (IN); Apurva S. Patel, Pune (IN); Prasad P. Purandare, Pune (IN); Chaitrali A. Talegaonkar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 14/962,284

(22) Filed: Dec. 8, 2015

(65) Prior Publication Data
US 2017/0163588 A1 Jun. 8, 2017

(51) Int. Cl.
*H04L 12/58* (2006.01)
(52) U.S. Cl.
CPC .............. *H04L 51/22* (2013.01); *H04L 51/24* (2013.01); *H04L 51/34* (2013.01)
(58) Field of Classification Search
CPC ........ H04L 51/00–38; H04L 51/18–34; G06Q 10/107; G06F 17/30867–30091
See application file for complete search history.

(56) References Cited

U.S. PATENT DOCUMENTS

| 8,005,907 B2 | 8/2011 | Haynes et al. |
| 8,219,629 B2 | 7/2012 | Haynes et al. |
| 8,782,158 B2 | 7/2014 | Cropper et al. |
| 2007/0088785 A1* | 4/2007 | Cama ................... G06Q 10/107 709/206 |
| 2007/0299923 A1 | 12/2007 | Skelly et al. |

(Continued)

FOREIGN PATENT DOCUMENTS

WO 2010077749 A2 7/2010

OTHER PUBLICATIONS

Abhijit A. Telang, et al., "Method & System for implementing Email and SMS reading status which will provide greater insight into Email & Mobile Communication", IP.com, Apr. 27, 2009, IP.com No. 000182329, IP.com Electronic Publication: Apr. 27, 2009.

(Continued)

*Primary Examiner* — Wing F Chan
*Assistant Examiner* — Rajeshwari Krishnan
(74) *Attorney, Agent, or Firm* — Farrokh Pourmirzaie; Edell, Shapiro & Finnan, LLC

(57) ABSTRACT

According to one embodiment of the present invention, a system for marking an email as partially read includes at least one processor. The at least one processor may be configured to determine the types of content contained in an email within a user's inbox. The at least one processor may be further configured to monitor the portions of each of the types of content of the email to determine which portions from each of the types of content that are viewed by the user. Furthermore, the at least one processor may be configured to determine a percentage of the content that has been viewed by the user. Finally, the at least one processor may be configured to then display the percentage of the content that has been viewed by the user.

18 Claims, 8 Drawing Sheets

(56) References Cited

U.S. PATENT DOCUMENTS

| | | | | |
|---|---|---|---|---|
| 2008/0275762 | A1* | 11/2008 | Cutler | G06Q 10/107 705/14.41 |
| 2009/0100376 | A1 | 4/2009 | Patel et al. | |
| 2009/0287779 | A1 | 11/2009 | Haynes et al. | |
| 2010/0095203 | A1 | 4/2010 | Toebes et al. | |
| 2010/0262922 | A1* | 10/2010 | Fan | G06Q 10/107 715/752 |
| 2011/0282733 | A1* | 11/2011 | Gnanasambandam | G06Q 30/02 705/14.44 |
| 2015/0220649 | A1* | 8/2015 | Papa | G06F 17/30867 707/722 |
| 2015/0261292 | A1* | 9/2015 | Conzola | G06F 3/013 345/156 |
| 2015/0370323 | A1* | 12/2015 | Cieplinski | G06F 3/013 345/156 |

OTHER PUBLICATIONS

Anonymously, "System and Method for determining critical section read acknowledgement in an Email", IP.com, IP.com No. 000217046.
IBM, "Evaluating newsletter effectiveness", IP.com, Jul. 16, 2009, IP.com No. 000185220.
IBM, "System and Method for providing section wise read receipt facility in Emails", IP.com, Aug. 13, 2009, IP.com No. 000186245.
Anonymously, "Method for Determining the Extent an E-Mail was Read", IP.com, IP.com No. 000203801.

* cited by examiner

DETECTING AND INDICATING PARTIAL READ STATUS OF EMAILS BASED ON EMAIL CONTENTS

BACKGROUND

1. Technical Field

Present invention embodiments relate to marking emails with a partially read status and, more specifically, determining if an email should be marked with a status of partial read and providing the partially read data of an email that has been marked with a status of partial read.

2. Discussion of the Related Art

Emails today have become a widest mode of communication across the globe. Users often have multiple email accounts and tend to receive numerous emails daily. Some emails require immediate action while action may be taken at a later point in time for other emails. The emails received by users often have references to additional types of content (e.g., emails contain URL's directing users to web pages or online documents, emails contain attachments in the form of documents, etc.). Today, computing devices can be equipped with software that tracks which documents are opened, what portions of the documents are viewed, etc.

However, there is no way to determine whether a document or URL from a particular email has been completely viewed or read by the user receiving the email. In addition, there are no means made available to track or monitor the documents which are viewed in a preview pane within the email software. Similarly, there is no way to track or monitor how much of the web resource linked to a URL within an email has been viewed or read by the user that received the email.

SUMMARY

According to one embodiment of the present invention, a system for marking an email as partially read includes at least one processor. The at least one processor may be configured to determine the types of content contained in an email within a user's inbox. The at least one processor may be further configured to monitor the portions of each of the types of content of the email to determine which portions from each of the types of content that are viewed by the user. Furthermore, the at least one processor may be configured to determine a percentage of the content that has been viewed by the user. Finally, the at least one processor may be configured to then display the percentage of the content that has been viewed by the user.

BRIEF DESCRIPTION OF THE DRAWINGS

Generally, like reference numerals in the various figures are utilized to designate like components.

Like reference numerals have been used to identify like elements throughout this disclosure.

DETAILED DESCRIPTION

Figure 1:
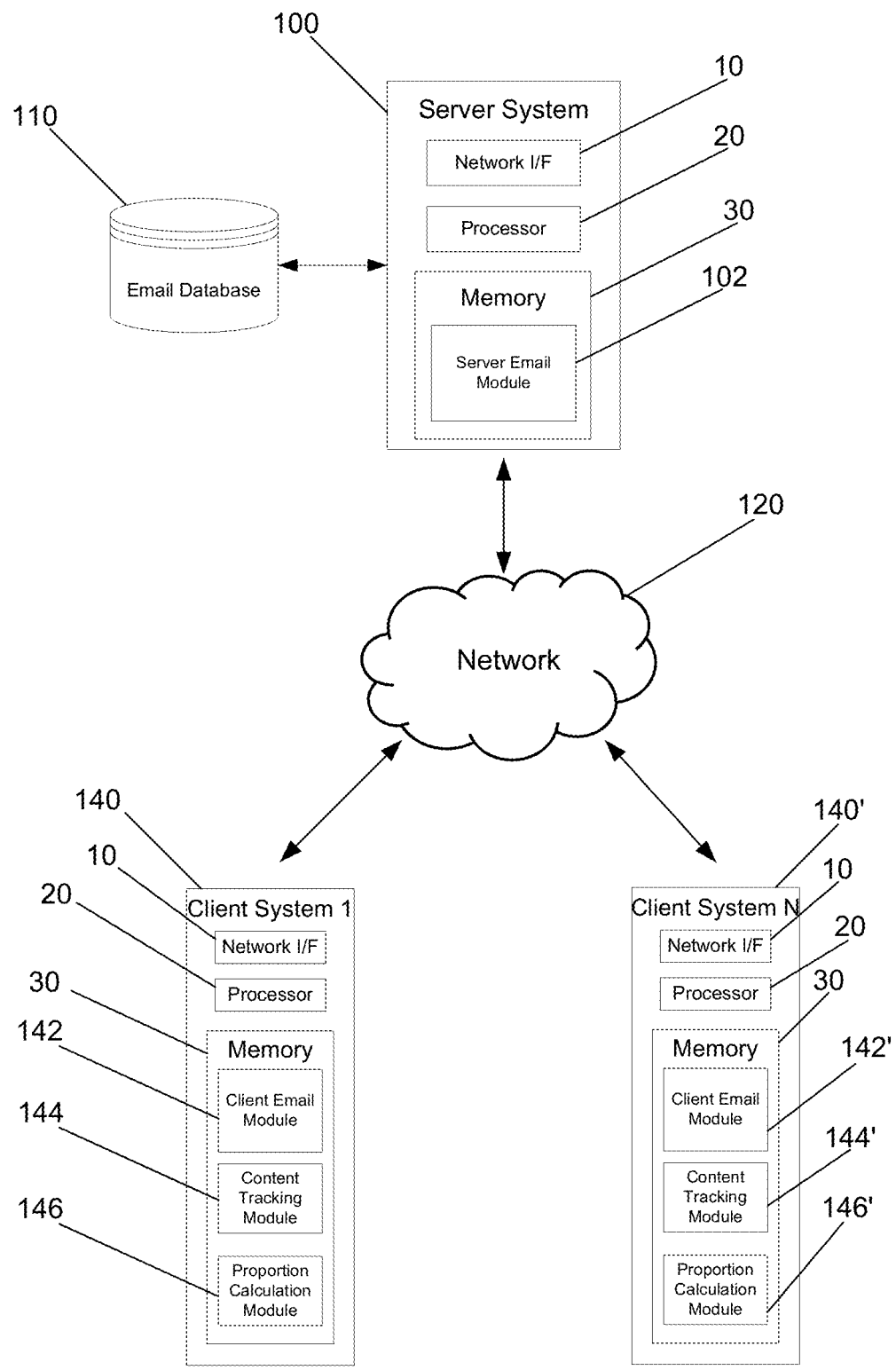
FIG. 1 is a diagrammatic illustration of an example of a computing environment for use with an embodiment of the present invention.

The present invention embodiments pertain to a system and method for determining whether an email, including all of its content, is unread, has been partially read, or has been fully read. The system includes tracking and monitoring modules that monitor what portions or sections of the various types of content of an email have been viewed by a user to determine if an email has been partially read. In addition, in the event that the user did partially read the email, the system may mark or identify where the user last left the content of the email for when the user returns to the content of the partially read email. The content of the email may be the body of the email itself, any attachments to the email (e.g., word documents, spread sheets, presentations, pdfs, etc.), and web resources linked to URL's presented in the body of the email. The system may track each of these types of content and determine a percentage of each of the types of content that were viewed or read by the user of the email. This data may be stored for later use by the user that received the email. In addition, the system may enable a user to forward a partially read email with all of the partial read data to another user for that user's reference. The system may display to the users, through alterations to their email inbox or the presentation of graphs or charts, the amount of the content of the email that was viewed or read.

Emails are one of the main sources of communication in today's world. The typical user of email receives numerous emails within a one day period, and several of these emails contain more than just text within the body of the email. Several of these emails may contain attachments or URL's to additional content on the web. In today's busy lifestyle, what often occurs is a recipient of an email opens the email and previews the attachment or URL. After some initial scanning and/or reading of the content, the recipients focus is shifted to another task that may have a higher priority. Thus, the recipient may not have completely reviewed the content of the email. However, in today's current email software, this email would have been marked as "read," which may lead to the recipient forgetting to return to the email at a later point in time. In addition, there are chances that the recipient might need to search for this particular partially read email after a few hours, days, or weeks. The recipient may have forgotten, however, where they last left off in the body of the email or in the attachment or in the web resource. The present invention embodiments may be used to track and display what emails have been partially read, along with what portions of the content of the email have been viewed or read by the users. The present invention embodiments may further enable a user to share the partial read data with other users to eliminate the overlap of different users reviewing the same portions of the content.

Thus, the present invention embodiments enable more efficient and effective use of emails.

An example environment for use with present invention embodiments is illustrated in FIG. 1. Specifically, the environment includes one or more server systems 100, and one or more client or end-user systems 140, 140'. Server systems 100 and client systems 140, 140' may be remote from each other and communicate over a network 120. The network 120 may be implemented by any number of any suitable communications media (e.g., wide area network (WAN), local area network (LAN), Internet, Intranet, etc.). Alternatively, server systems 100 and client systems 140, 140' may be local to each other, and communicate via any appropriate local communication medium (e.g., local area network (LAN), hardwire, wireless link, Intranet, etc.).

Server systems 100 and client systems 140, 140' may be implemented by any conventional or other computer systems preferably equipped with a display or monitor, a base (e.g., including at least one processor 20, one or more memories 30 and/or internal or external network interfaces or communications devices 10 (e.g., modem, network cards, etc.)), optional input devices (e.g., a keyboard, mouse or other input device), and any commercially available and custom software (e.g., server/communications software, client email module, server email module, content tracking module, proportion calculation module, browser/interface software, etc.).

Client systems 140, 140' enable users to establish communication links via communication channels (e.g., email, SMS/text messaging, tweeting, instant messaging, audio calls, video chats, etc.) with other client systems 140, 140' and/or the server system 100. The client systems 140, 140' may include client email modules 142, 142' that access the email account of the users of the client systems 140, 140', content tracking modules 144, 144' that track and/or record what content of an email has been viewed by the users of the client systems 140, 140', and proportion calculation modules 146, 146' that determine, from the information acquired by the content tracking module, the ratios of the content of an email that have been viewed. When the modules 142, 142', 144, 144', 146, 146' are used to monitor and determine the portions of the email content that has been viewed, the client email modules 142, 142' may utilize the gathered or determined associated content information with the emails with which they are associated. The server system 100 may include a server email module 102 that collects and stores the emails and associated partial read data from each of the client systems 140, 140' in the email database 110.

Modules 102, 142, 142', 144, 144', 146, 146' may include one or more modules or units to perform the various functions of present invention embodiments described below. The various modules (e.g., client email modules, server email modules, content tracking modules, and proportion calculation modules, etc.) may be implemented by any combination of any quantity of software and/or hardware modules or units, and may reside within memory 30 of the server 100 and/or client systems 140, 140' for execution by processor 20.

In the environment illustrated in FIG. 1, the client email modules 142, 142' of the client systems 140, 140' provide access to the emails of a user's email account. The client email modules 142, 142' may enable users to receive, view, and send emails from various senders and recipients. The client email modules 142, 142' may further enable users of the client systems 140, 140' to access the content of each of the emails. Content may refer to the text within the body of the email itself, any file attachments that are attached to the emails, or web resources (e.g., web sites, web documents, etc.) to which uniform resource locators (URL's) located within the emails direct the client systems 140, 140'. The content tracking modules 144, 144' may track what portions, sections, or segments of the content of the email has been viewed, or read, by the users of the client systems 140, 140' and mark these portions, sections, or segments for future reference by the users of the client systems 140, 140'. Thus, the content tracking modules 144, 144' may track the portions of the body of the email viewed by the users, the portions of the file attachments viewed by the users, and/or the portions of the web resources viewed by the users. The content tracking modules 144, 144' may track the portions of the content that has been read by the users of the client systems 140, 140' by monitoring the amount of time a portion of the content is displayed, the click flow path of the users, the portions of the content that have been highlighted by the users, etc.

Finally, the proportion calculation modules 146, 146' may determine what percentage of the content of an email has been read. The proportion calculation modules 146, 146' may also determine a percentage of the content that was read by the users for each type of content. For example, the proportion calculation modules 146, 146' may determine a percentage of the body of the email itself that has been read. Furthermore, the proportion calculation modules 146, 146' may determine what percentage of the file attachment that has been read by the users of the client systems 140, 140'. The proportion calculation modules 146, 146' may also separately determine the percentage that the web resource has been read by the users of the client systems 140, 140'. These percentages may be calculated from the length or size of the content and the length or size of the portions of the content have been marked or identified as read by the content tracking modules 144, 144' in comparison with the total length or size of the content. The percentages can be combined to determine the overall percentage for all the content of an entire email.

Once these percentages have been determined, the partial read data may be stored on the email database 110 of the server system 100 by the server email module 102. The partial read data may be the information of what portions have been identified as being read along with the percentages of the content that has been read. The information may be stored and linked with the email that the data is associated with. The client email modules 142, 142' may utilize this associated information to display whether an email should be marked as read, unread, or partially read within the inbox of the users of the client systems 140, 140'. If the client email modules 142, 142' determine that the email should be displayed as partially read in the inbox, the client email modules 142, 142' may further display the calculated overall percentage of the content of the email that has been read by the users of the client systems 140, 140'. The client email modules 142, 142' may further allow for the users of the client systems 140, 140' to sort the emails in their inbox based on whether or not they have been partially read and by the percentage in which they have been partially read.

Figure 2:
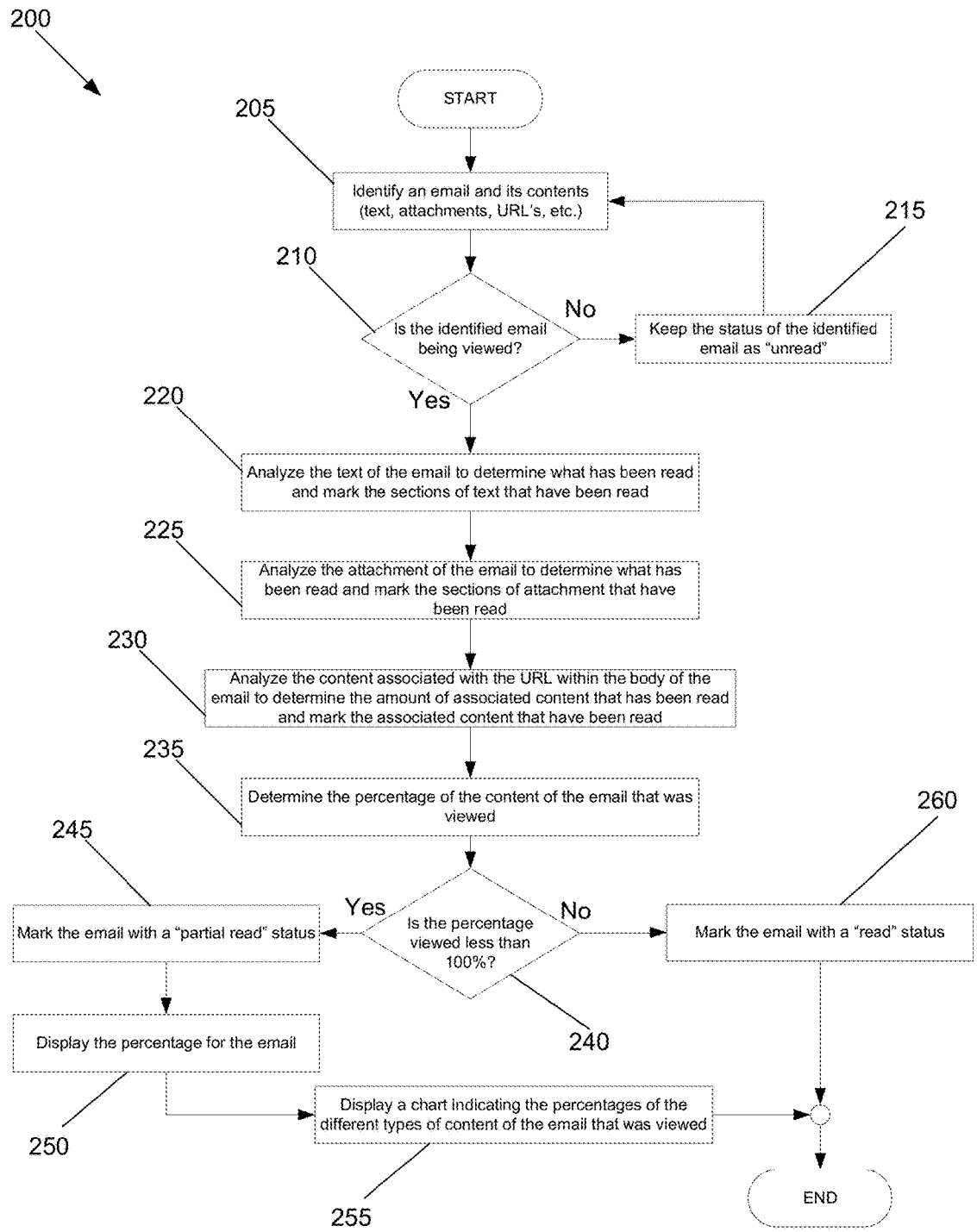
FIG. 2 is a procedural flow chart illustrating an example manner for determining the partial read status of an email according to an embodiment of the present invention.

Turning to FIG. 2, illustrated is a flow chart 200 of the steps performed for identifying the partially read emails on a client system 140, 140'. As previously explained, the client email modules 142, 142' displays the inbox of the users' email accounts on the client systems 140, 140', where the inbox contains the emails of the users' email accounts. At block 205, the client email modules 142, 142' identify an email in the inbox of the users' email accounts and all of the associated content of the email. As previously explained, the associated content of the email may refer to the text within the body of the email itself, any file attachments that are attached to the email, or the web resources to which URL's located within the emails direct the client systems 140, 140'. As emails are received in the inbox displayed on the client systems 140, 140', the client email modules 142, 142' marks the status of the emails as unread. At block 210, the client email modules 142, 142' determine if the email is being viewed by the users of the client systems 140, 140'. The users of the client systems 140, 140' may view the email and associated content either by opening the email or by viewing the content of the email within a preview pane of the client email modules 142, 142'. If the client email modules 142, 142' determine that the identified email is not being viewed by the users of the client systems 140, 140', then at block 215, the client email modules 142, 142' keep the status of the email as "unread."

However, if at block 210 the client email modules 142, 142' determine that the email and its associated content is being viewed, then at block 220 the content tracking modules 144, 144' begin monitoring the portions of the content that are viewed by the users of the client systems 140, 140'. More specifically, at block 220, the content tracking modules 144, 144' analyze and determine what sections of the text in the body of the email have been viewed by the users of the client systems 140, 140' and marks these sections that have been viewed by the users of the client systems 140, 140'. At block 225, the content tracking modules 144, 144' analyze and determine what sections of the attachments of the email have been viewed by the users of the client systems 140, 140' and marks these sections that have been viewed by the users of the client systems 140, 140'. At block 230, the content tracking modules 144, 144' further analyze and determine what sections of the web resources associated with the URL's within the body of the email have been viewed by the users of the client systems 140, 140' and marks these sections that have been viewed by the users of the client systems 140, 140'.

After the content tracking modules 144, 144' have determined and marked the sections of the content of the email that has been viewed by the users of the client systems 140, 140', then at block 235, the proportion calculation modules 146, 146' determine the percentage of the content of the email that has been viewed by the users of the client systems 140, 140'. As explained previously, the proportion calculation modules 146, 146' may determine the percentage of all of the content of the email or may determine a percentage for each type of content of the email. Furthermore, these percentages may be calculated from the length or size of the portions of the content has been marked or identified as read by the content tracking module 144, 144' in comparison with the total length or size of the content.

Figure 8:
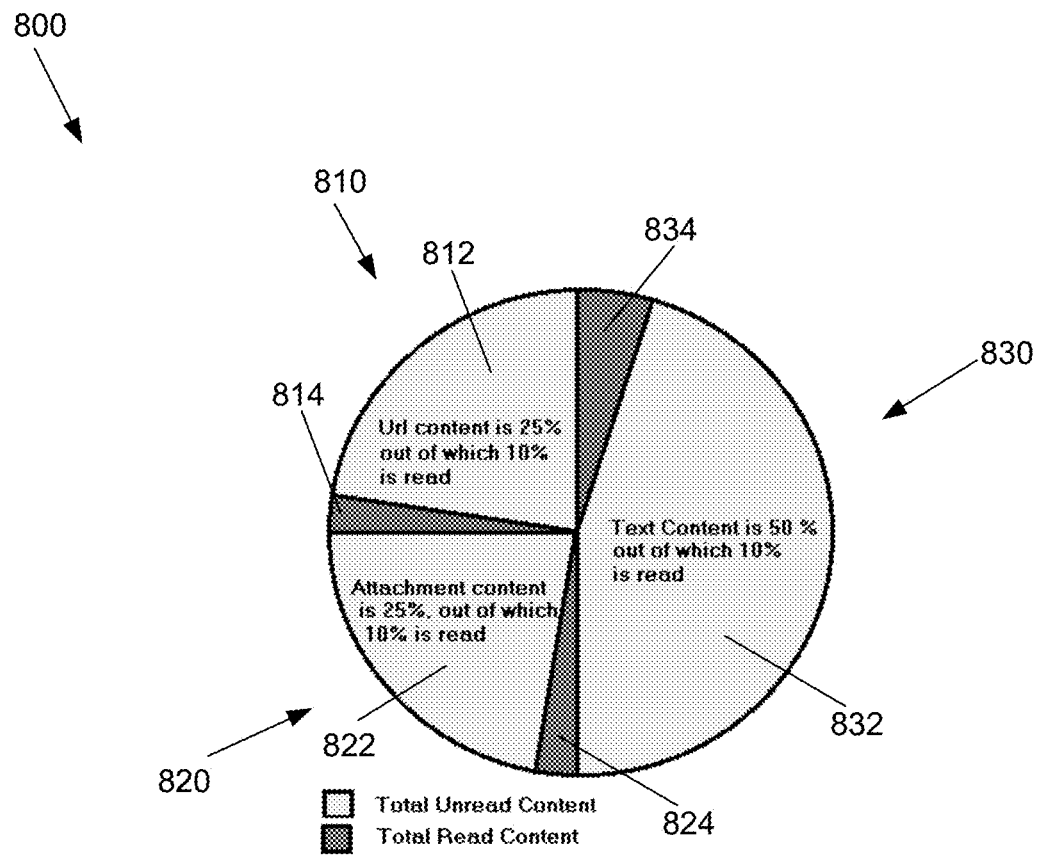
FIG. 8 is an example of a graph that displays the percentage of the content that has been read and the percentage of the content that is unread according to an embodiment of the present invention.

The client email modules 142, 142', at block 240, may determine if the percentage of the content that is read by the users of the client systems 142, 142' is less than 100%. If the percentage is less than 100%, then the client email modules 142, 142' may mark the email with the status of "partial read." After the client email modules 142, 142' have marked the email with the status of "partial read", then at block 250, the client email modules 142, 142' may display the percentage of content read for that specific email identified in block 205. In addition, at block 255, the client email modules 142, 142' may display a chart or graph, as illustrated in FIG. 8, of the percentages of each of the different types of content for the identified email. The chart, as illustrated in FIG. 8, may illustrate the percentage that each type of content that was read, the percentage of each type of content that remains unread, and the percentage that each type of content makes up of the total overall size of the content of the email. In addition, the chart may be displayed automatically or may be requested by the users of the client systems 140, 140'. However, if at block 240, the client email modules 142, 142' determine that the percentage of the content that is read by the users of the client systems 140, 140' is equal to 100%, then at block 260, the client email modules 142, 142' mark the email with the status of "read."

Figure 3:
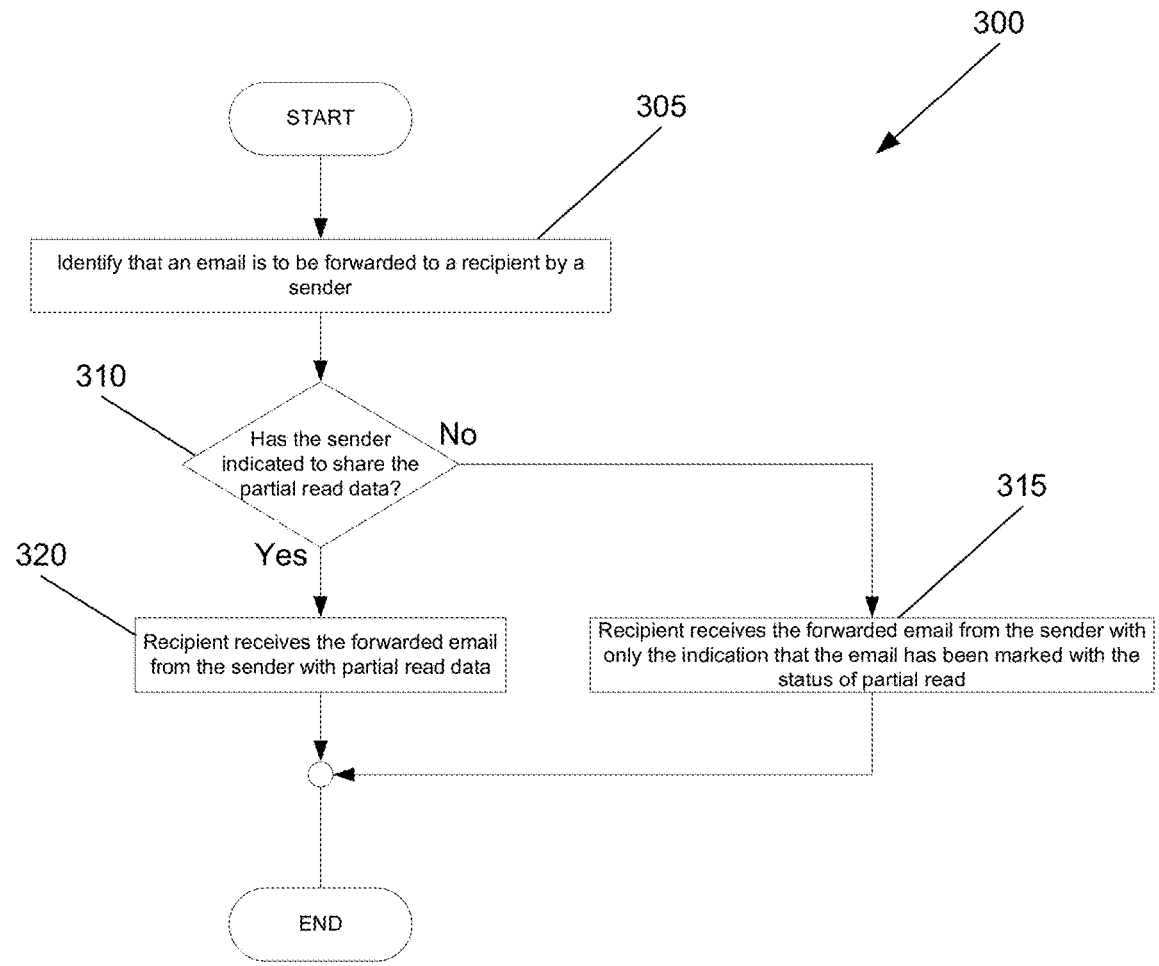
FIG. 3 is a procedural flow chart illustrating an example manner for forwarding a partially read email according to an embodiment of the present invention.

Turning to FIG. 3, illustrated is a flowchart 300 illustrating the process of a user of the client systems 140, 140' forwarding an email that has been marked by the client email modules 142, 142' with the status of "partial read." At block 305, the user of the client systems 140, 140' decides to forward an email from their inbox to another recipient, where the email being forwarded has been marked by the client email modules 142, 142' as "partial read." When forwarding an email that has a status of "partial read," the user forwarding the email has the option to forward the email and its contents to the recipient with or without the partial read data. The partial read data of an email may include the percentage of the email that has been read by the users of the client systems 140, 140' and the markings of the sections of the different types of content that have been viewed or read by the users of the client systems 140, 140'. At block 310, the client email modules 142, 142' determine if the sender of the email to be forwarded has indicated that they wish to share the partial read data with the intended recipient of the forwarded email. If, at block 310, the client email modules 142, 142' determine that the sender of the forwarded email does not wish to share the partial read data of the forwarded email, then, at block 315, the recipient would receive the forwarded email without any of the partial read data. Thus, in other words, the recipient would receive the email from the sender as a recipient would typically receive a forwarded email. The email may, however, indicate that the forwarded email was partially read by the sender of the email without indicating what percentage, or without containing the markings of the portions of the content of the email that were read by the sender of the email. Conversely, if at block 310, the client email modules 142, 142' determine that the sender of the forwarded email does wish to share the partial read data of the forwarded email, then at block 320, the recipient would receive the forwarded email with the partial read data. Thus, the recipient of the forwarded email will be able to view what sections of the email content have been read by the sender of the forwarded email, as well as the percentage of the email content that the sender has viewed or read.

Figure 4:
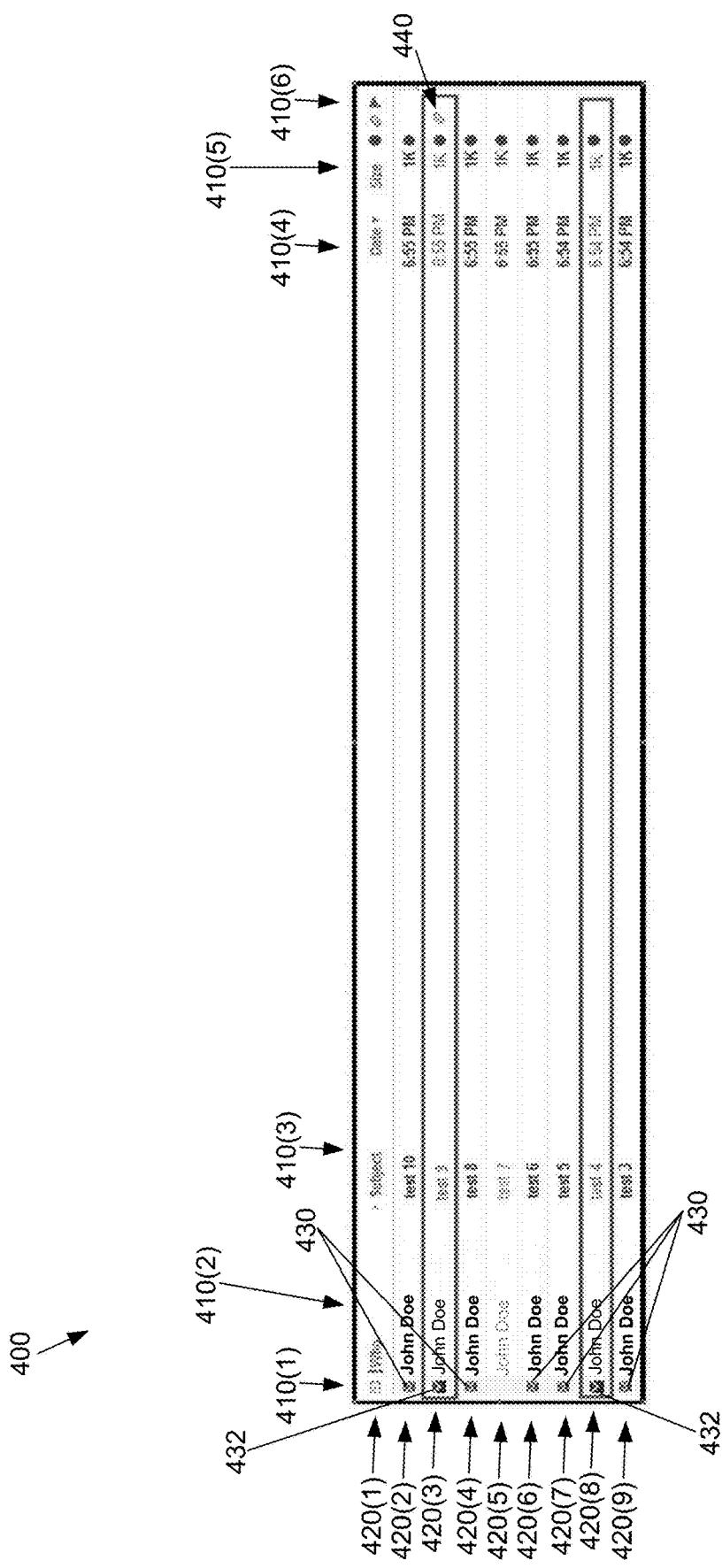
FIG. 4 is an illustration of a first example inbox displaying emails according to an embodiment of the present invention.

Turning to FIG. 4, illustrated is a first example embodiment of an inbox 400 of a user's email account in accordance with the client email modules 142, 142'. The inbox 400 illustrated in FIG. 4 may include six columns 410(1)-410(6) and nine rows 420(1)-420(9). The first row 420(1) may be a header, where rows 420(2)-420(9) may each represent one email in the inbox of the users of the client systems 140, 140'. While only nine rows 420(1)-420(9) are illustrated, more or less rows could be added to illustrate more or less than 8 emails in the inbox 400. The first column 410(1) may contain an indicator or icon 430, 432 to illustrate the status of each of the emails in rows 420(2)-420(9). As illustrated in FIG. 4, the first icon 430 may be a first type of envelope, while the second icon 432 may be a second type of envelope that contains a different appearance from the first type of envelope. The first icon 430 may indicate that the email has not yet been read, and is marked with the status of "unread." The second icon 432 may indicate that the email has been partially read by the users of the client systems 140, 140', and has been marked with the status of "partial read." The first column 410(1) may not contain any icons or indicators when the full email and all of the associated content has been read or viewed by the users of the client systems 140, 140'. While envelopes are illustrated in FIG. 4 for the icons 430, 432, any design could be used for the icons 430, 432. Based on the icons 430, 432, the emails of rows 430(3) and 430(8) have been partially read, the emails of rows 420(2), 420(4), 420(6), 430(7), and 420(9) are unread, and the email of row 420(5) has been fully read by the users of the client systems 140, 140'.

The second column 410(2) may contain text of the identity of the sender of each of the emails in rows 420(2)-420(9). The third column 410(3) may contain the subject line of each of the emails in rows 420(2)-420(9). The fourth column 410(4) may contain the date and/or time that each of the emails in rows 420(2)-420(9) were received by the recipient. The fifth column 410(5) may contain the size of each of the emails in rows 420(2)-420(9) of the inbox 400. The status of the emails of rows 420(2)-420(9) may be further marked by their font properties (font, font color, font size, font styling, etc.). For example, the text of columns 410(2)-410(5) is bolded for the unread emails of rows 420(2), 420(4), 420(6), 430(7), and 420(9). Moreover, the text of columns 410(2)-410(5) is unbolded and contains a lighter shade of color for the partially read emails of 430(3) and 430(8) when compared with the unread emails of rows 420(2), 420(4), 420(6), 430(7), and 420(9). As further illustrated in FIG. 4, the text of the completely read email of row 420(5) is a lighter shade then the text for both the partially read emails and the unread emails. Finally, the sixth column 410(6) may contain an indicator or icon 440 that illustrates which one of the emails in rows 420(2)-420(9) that contain an attachment. As illustrated in FIG. 4, the icon 440 used to indicate the presence of an attachment is a paperclip. However, any design for the icon 440 could be used. As illustrated in FIG. 4, only the email in the third row 420(3) contains an attachment.

Figure 5:
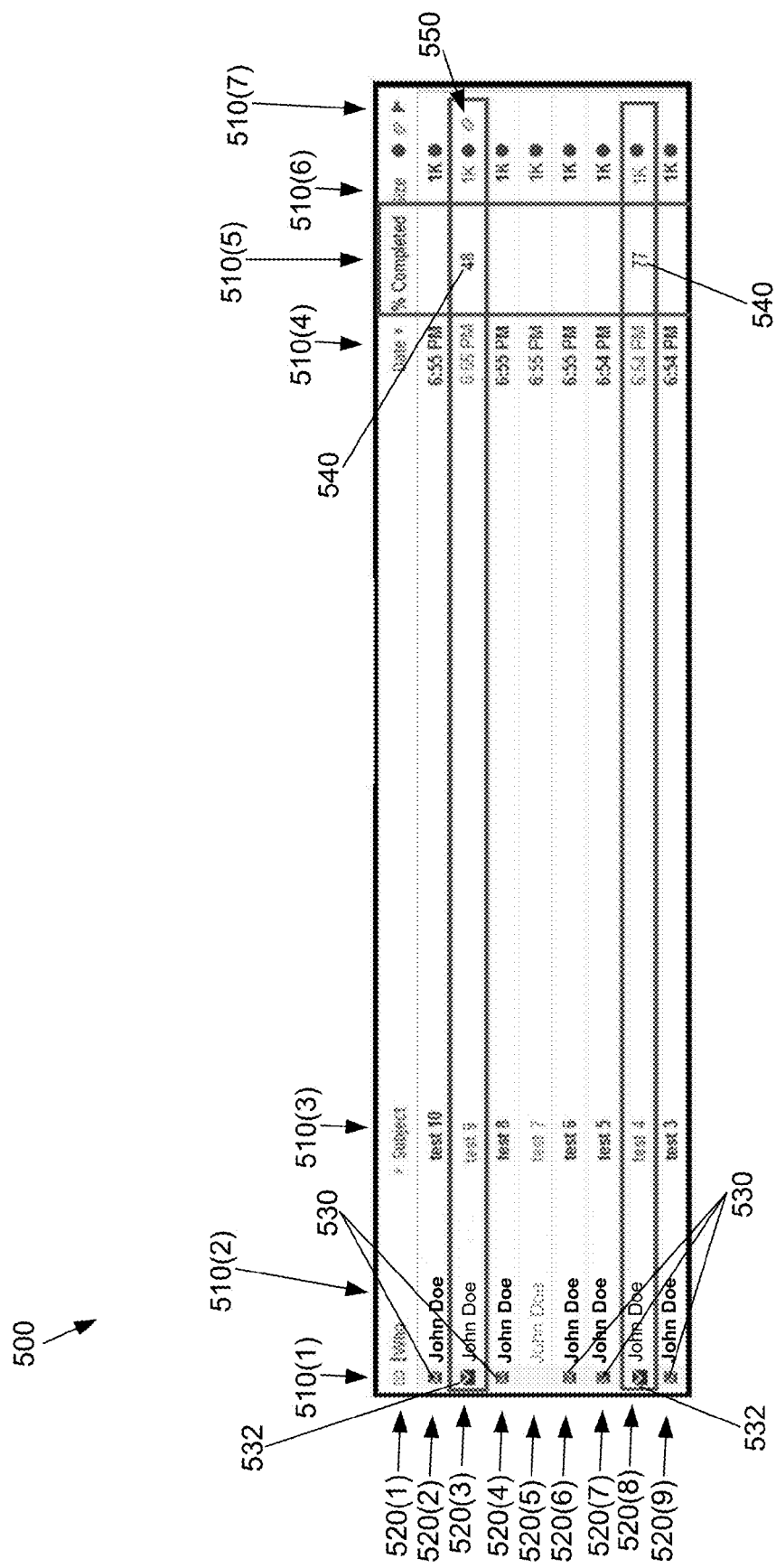
FIG. 5 is an illustration of a second example inbox displaying emails according to an embodiment of the present invention.

Turning to FIG. 5, illustrated is a second example embodiment inbox 500 of a user's email account in accordance with the client modules 142, 142'. The inbox 500 illustrated in FIG. 5 is similar to the inbox 400 illustrated in FIG. 4. However, the inbox 500 includes seven columns 510(1)-510(7) and nine rows 520(1)-520(9). The first row 520(1) may be a header, where rows 520(2)-520(9) may each represent one email in the inbox 500 of the users of the client systems 140, 140'. While only nine rows 520(1)-520(9) are illustrated, more or less rows could be added to illustrate more or less than eight emails in the inbox 500. Similar to the first embodiment of the inbox 400, the first column 510(1) may contain an indicator or icon 530, 532 to illustrate the status of each of the emails in rows 520(2)-520(9). The first icon 530 may be a first type of envelope, while the second icon 532 may be a second type of envelope with an appearance that differs from the first type of envelope. The first icon 530 may indicate that the email has not yet been read, and is marked with the status of "unread." The second icon 532 may indicate that the email has been partially read by the users of the client systems 140, 140', and has been marked with the status of "partial read." Furthermore, the first column 510(1) may not contain any icons or indicators when the full email and all of the associated content has been read or viewed by the users of the client systems 140, 140'. While envelopes are illustrated in FIG. 5 for the icons 530, 532, any design could be used for the icons 530, 532. Based on the icons 530, 532, the emails of rows 520(3) and 520(8) have been partially read, the emails of rows 520(2), 520(4), 520(6), 530(7), and 520(9) are unread, and the email of row 520(5) has been fully read by the users of the client systems 140, 140'.

The second column 510(2) may contain the identity of the sender of each of the emails in rows 520(2)-520(9). The third column 510(3) may contain the subject line of each of the emails in rows 520(2)-520(9). The fourth column 510(4) may contain the date and/or time that each of the emails in rows 520(2)-520(9) were received by the recipient. The fifth column 510(5) may contain percentage indicators 540 for the emails of the inbox 500, where the percentage indicators 540 indicate the amount or percent of the content of the email that has been read by the users of the client systems 140, 140'. Thus, as illustrated in FIG. 5, the user of the inbox 500 has read 48 percent of the partially read email of row 520(3), and has read 77 percent of the partially read email of row 520(8). While not illustrated in FIG. 5, the fifth column may contain percentage indicators 540 for the unread and completely read emails of the inbox 500. The unread emails may contain a percentage indicator 540 of 0 percent, while the completely read emails may contain a percentage indicator of 100 percent. The sixth column 510(6) may contain the size of each of the emails in rows 520(2)-520(9) of the inbox 500. Finally, the seventh column 510(7) may contain an indicator or icon 550 that illustrates which one of the emails in rows 520(2)-520(9) that contain an attachment. As illustrated in FIG. 5, the icon 550 used to indicate the presence of an attachment is a paperclip. However, any design for the icon 550 could be used. As illustrated in FIG. 5, only the partially read email in the third row 520(3) contains an attachment.

The status of the emails of rows 520(2)-520(9) may be further marked by their font properties (font, font color, font size, font styling, etc.) rather than just an icon 530, 532 and a percentage indicator 540. For example, the text of columns 510(2)-510(6) is bolded for the unread emails of rows 520(2), 520(4), 520(6), 530(7), and 520(9). Moreover, the text of columns 510(2)-510(6) is unbolded and contains a lighter shade of color for the partially read emails of rows 520(3) and 520(8) when compared with the unread emails of rows 520(2), 520(4), 520(6), 530(7), and 520(9). As further illustrated in FIG. 5, the text of the completely read email of row 520(5) is a lighter shade then the text for both the partially read emails and the unread emails.

Figure 6:
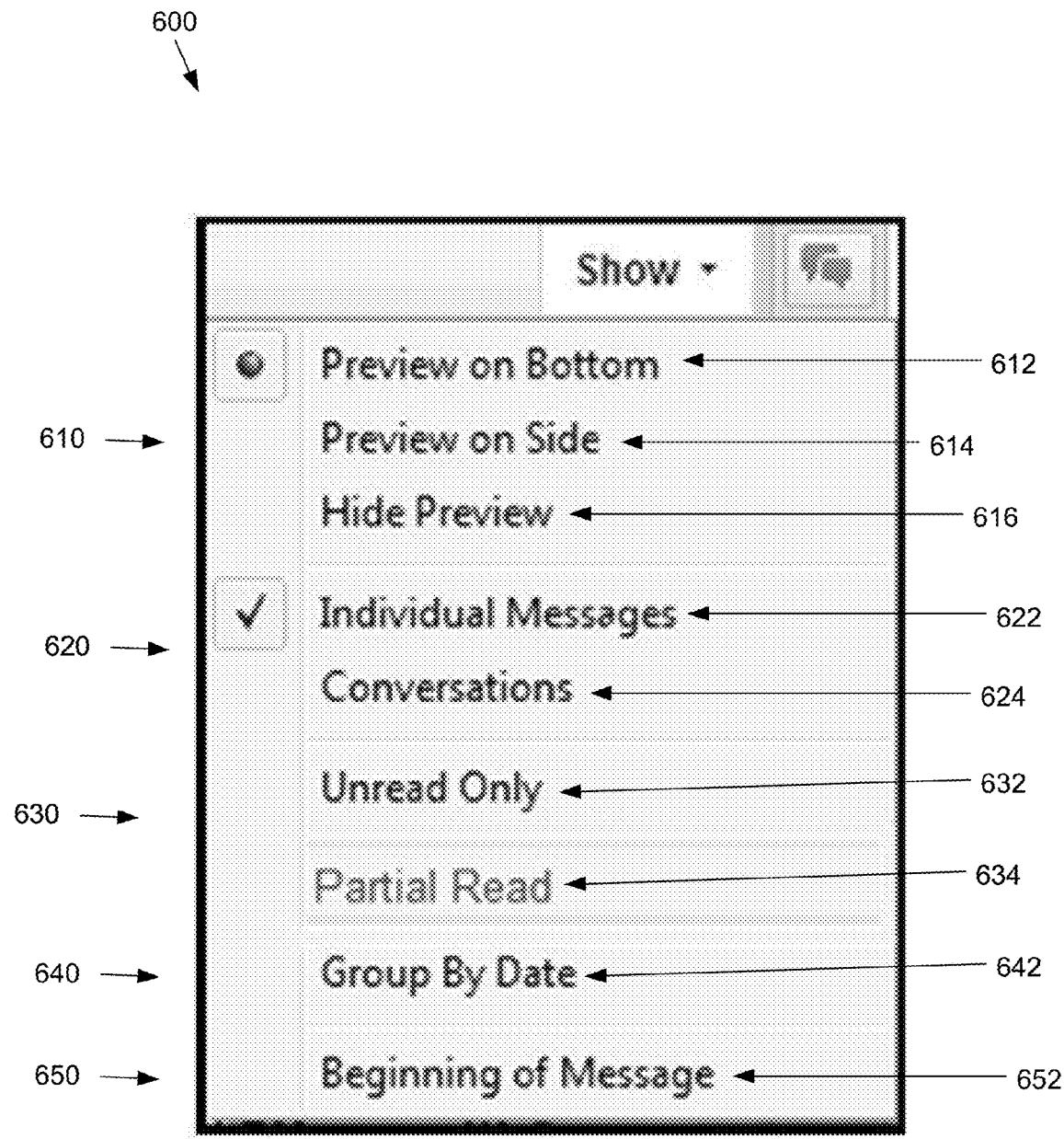
FIG. 6 is an example of a display menu according to an embodiment of the present invention, the display menu providing the option to display the partially read emails.

Turning to FIG. 6, illustrated is an embodiment of a menu 600 available in the inboxes 400, 500. The menu 600 may be a drop down menu available by the client email modules 142, 142'. The menu 600 may provide options for determining how to view emails within the inboxes 400, 500. As illustrated, the menu 600 contains five sections 610, 620, 630, 640, 650. The first section 610 of the menu 600 may present options for positioning a preview pane that provides a view of an email when the email is highlighted or selected within the inboxes 400, 500. The first section 610, may allow a user to "Preview on Bottom" 612, "Preview on Side" 614, or "Hide Preview." The second section 620 of the menu 600 may present options for displaying the email messages that are received. Thus, the user of the inboxes 400, 500 may select to view their emails as "Individual Messages" 622 or as "Conversations" 624. The third section 630 of the menu 600 may present options to the user of the inboxes 400, 500 for determining what emails to display based on their status. Thus, as illustrated in FIG. 6, the users may be able to select "Unread Only" 632 to display only the emails in the inboxes 400, 500 that are unread. The users may be also able to select "Partial Read" 634 to display the partial read emails and/or the data of the emails as illustrated for the inboxes 400, 500 of FIGS. 4 and 5. In another embodiment, selection of the "Partial Read" 634 icon on the menu 600 may further be used to only show the partially read emails in the inboxes 400, 500. As further illustrated in FIG. 6, the menu 600 may further provide email viewing options, such as "Group By Date" 642, and "Beginning of Message" 652.

Figure 7:
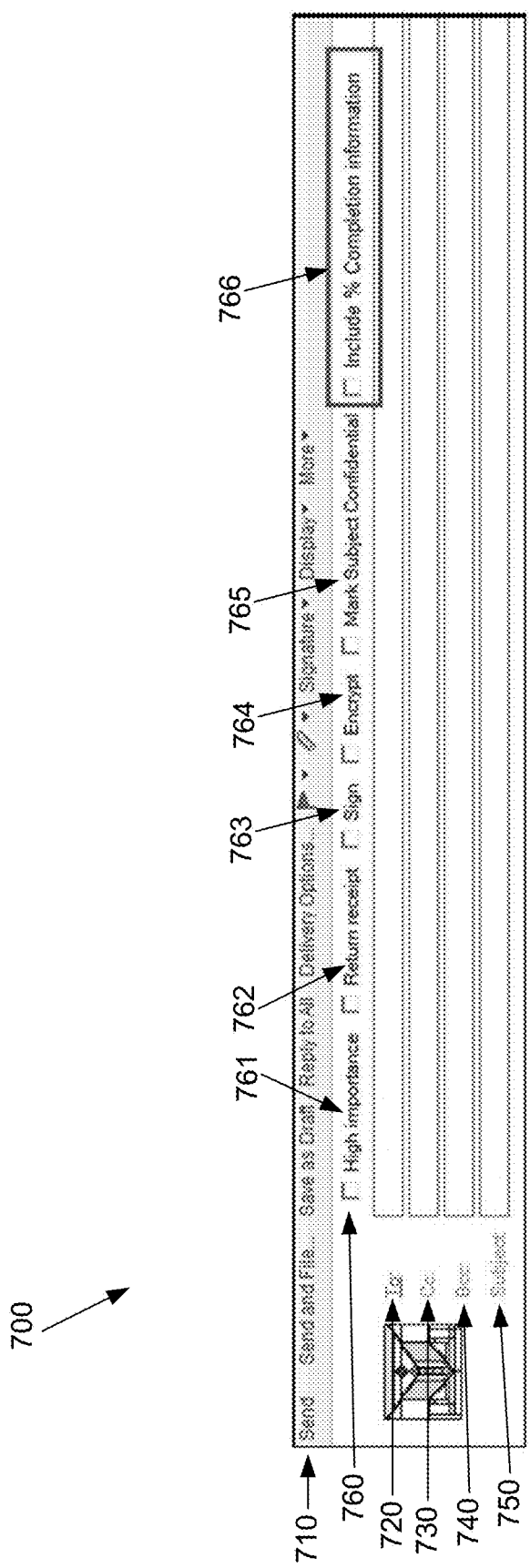
FIG. 7 is an example of an email header according to an embodiment of the present invention.

Turning to FIG. 7, illustrated is an embodiment of an email heading 700 for sending an email, especially when forwarding an email. The email heading 700 provides a toolbar 710 along the top of the heading 700. The toolbar 710 provides buttons that are options for sending the email, such as "Send," "Send and File," "Save as Draft," "Reply to All." The toolbar 710 further provides drop down menus, such as "Delivery Options," a menu for flagging the email, a menu for attaching attachments to the email, "Signature," "Display," and "More." In addition to the toolbar 710, the heading 700 includes a "To" field 720, where the sender of the email can place the addresses of the recipients of the email. The heading 700 further includes a "Cc" field 730, a "Bcc" field 740, and a "Subject" field 750. These fields 720, 730, 740, 750 are positioned below the toolbar 710. Furthermore, between the "To" field 720 and the toolbar 710 may be a series of sending options 760. The sending options 760 include a "high importance" checkbox 761, a "return receipt" checkbox 762, a "sign" checkbox 763, an "encrypt" checkbox 764, a "mark subject confidential" checkbox 765, and an "include % completion information" checkbox 766. The "include % completion information" checkbox 766 enables the users of the client systems 140, 140' to determine if they want to send the partial read data of the email in accordance with the flowchart 300 of FIG. 3. Thus, when the "include % completion information" checkbox 766 is selected, the forwarded email will include the partial read data of the email being forwarded, such as the percentage of the email contents that were read by the sender and the markings of the read sections of the email contents. When the "include % completion information" checkbox 766 is not selected, the forwarded email will not include any of the partial read data from the email being forwarded, but the email may still indicate to the recipient of the forwarded email that it has been partially read by the sender.

Turning to FIG. 8, illustrated is a chart or graph 800 illustrating the total content of an email and the percentage of each type of content that has been read by a user of the client systems 140, 140'. As illustrated in FIG. 8, the chart 800 is a pie chart 800 consisting of three sections 810, 820, 830. Section 810 of the pie chart 800 represents the portion of the content of an email that is a web resource associated with a URL located in the body of the email. Thus, the web resource type of content makes up 25% of the total content of the email. Section 820 of the pie chart 800 represents the portion of the content of an email that is an attachment of the email. Thus, as illustrated in FIG. 8, the attachment type of content makes up 25% of the total content of the email. Section 830 of the pie chart 800 represents the portion of the content of an email that is the text of the body of the email. Thus, as illustrated in FIG. 8, the text of the body type of content makes up 50% of the total content of the email.

As further illustrated in FIG. 8, slice 812 of the pie chart 800 represents the portion of the web resource content that is unread by the users of the client systems 140, 140', while slice 814 of the pie chart 800 represents the portion of the web resource content that has been read by the users of the client systems 140, 140'. Similarly, slice 822 of the pie chart 800, as illustrated in FIG. 8, represents the portion of the attachment content that is unread by the users of the client systems 140, 140', while slice 824 of the pie chart 800 represents the portion of the attachment content that has been read by the users of the client systems 140, 140'. Finally, slice 832 of the pie chart 800, as illustrated in FIG. 8, represents the portion of the text body content that is unread by the users of the client systems 140, 140', while slice 834 of the pie chart 800 represents the portion of the text body content that has been read by the users of the client systems 140, 140'. As illustrated in FIG. 8, each of the read slices 814, 824, 834 represents approximately 10% of their respective sections 810, 820, 830. Thus, slices 812 and 822 of the pie chart 800 represent that 15% of the web resource and 15% of the attachment, respectively, are currently unread. In addition, slice 832 of the pie chart 800 represents that 40% of the text of the body of the email is unread.

It will be appreciated that the embodiments described above and illustrated in the drawings represent only a few of the many ways of implementing embodiments for indicating an email as partially read, providing the percentage of the email that was partially read, and forwarding the partially read data of an email to a recipient.

The embodiments described above and illustrated in the drawings improve the user's experience using email software. Often, especially when receiving multiple emails throughout a period of time and in busy environments, an email is received where a user begins to preview or review a portion of the incoming email, but the focus of the user is quickly shifted to another task or topic. The present invention provides a means for users to track the emails that have been partially read and track where the user stopped reviewing partially read emails. This enables users to more efficiently use their inbox and aids in preventing users from forgetting to return to partially read emails at a later point in time. In addition, the present invention further provides more efficiency between members of a group. For example, if an employee reviews a portion of an email and determines, in the middle of reviewing the email, that the remaining portions of the content of the email would be better handled by a colleague, the employee can forward the email to the colleague with the partially read data of the forwarded email. This enables the colleague to work more efficiently by only reviewing the portions of the forwarded email that has not been reviewed by the employee.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, client email modules, server email modules, content tracking modules, and proportion calculation modules, etc.). These systems may include any types of monitors and input devices (e.g., keyboard, mouse, voice recognition, etc.) to enter and/or view information.

It is to be understood that the software (e.g., client email modules, server email modules, content tracking modules, and proportion calculation modules, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., client email modules, server email modules, content tracking modules, and proportion calculation modules, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., emails, email addresses, percentage of the email that has been read, percentage of the text of the body of the email that has been read, percentage of the attached file to the email that has been read, percentage of the web resource referenced in the body of the email that has been read, markings of the portions of the different types of content that have been read, etc.). The database system may be implemented by any number of any conventional or other databases, data stores or storage structures (e.g., files, databases, data structures, data or other repositories, etc.) to store information (e.g., emails, email addresses, percentage of the email that has been read, percentage of the text of the body of the email that has been read, percentage of the attached file to the email that has been read, percentage of the web resource referenced in the body of the email that has been read, markings of the portions of the different types of content that have been read, etc.). The database system may be included within or coupled to the server and/or client systems. The database systems and/or storage structures may be remote from or local to the computer or other processing systems, and may store any desired data (e.g., emails, email addresses, percentage of the email that has been read, percentage of the text of the body of the email that has been read, percentage of the attached file to the email that has been read, percentage of the web resource referenced in the body of the email that has been read, markings of the portions of the different types of content that have been read, etc.).

The present invention embodiments may employ any number of any type of user interface (e.g., Graphical User Interface (GUI), command-line, prompt, etc.) for obtaining or providing information (e.g., emails, email addresses, percentage of the email that has been read, percentage of the text of the body of the email that has been read, percentage of the attached file to the email that has been read, percentage of the web resource referenced in the body of the email that has been read, markings of the portions of the different types of content that have been read, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for determining an option for any activity between the participants by analyzing the preferences, limitations, and capabilities of each of the participants.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of processing an email comprising:
    determining, via a processor, types of content included in an email received by a current recipient from a previous recipient of the email, wherein the email includes a percentage of content of the email viewed by the previous recipient;
    monitoring, via the processor, actions performed by the current recipient for each type of content of the email displayed to the current recipient
    marking, via the processor, sections of each type of content of the email viewed by the current recipient based on the monitoring;
    determining, via the processor, a percentage of content viewed by the current recipient based on the marked sections of each type of content of the email; and
    forwarding, via the processor, the email including markings of the sections of each type of content viewed by the current recipient and the percentage of the content viewed by the current recipient.

2. The method of claim 1, wherein the types of content of the email include text disposed in a body of the email, an attachment of the email, and a web site referenced in the email.

3. The method of claim 2, wherein determining the percentage of the content includes:
    determining a first percentage that represents an amount of the text disposed within the body of the email that has been viewed by the current recipient;
    determining a second percentage that represents an amount of the attachment of the email that has been viewed by the current recipient;
    determining a third percentage that represents an amount of the web site referenced in the email that has been viewed by the current recipient; and
    determining a fourth percentage that represents a combination of the first percentage, second percentage, and third percentage.

4. The method of claim 1, wherein the percentage of the content that has been viewed by the current recipient is displayed in an inbox that displays a plurality of emails.

5. The method of claim 4, wherein the inbox is sorted based on the percentage each of the plurality of emails has been viewed.

6. The method of claim 1, wherein the percentage of the content that has been viewed by the current recipient is graphically displayed.

7. A system for processing an email comprising:
    at least one processor; and
    a memory storing computer-readable instructions when executed by the at least one processor configure the system to:
        determine types of content included in an email received by a current recipient from a previous recipient of the email, wherein the email includes a percentage of content of the email viewed by the previous recipient;
        monitor actions performed by the current recipient for each type of content of the email displayed to the current recipient mark sections of each type of content of the email viewed by the current recipient based on the monitoring;
        determine a percentage of content viewed by the current recipient based on the marked sections of each type of content of the email; and
        forward the email including markings of the sections of each type of content viewed by the current recipient and the percentage of the content viewed by the current recipient.

8. The system of claim 7, wherein the types of content of the email include text disposed in a body of the email, an attachment of the email, and a web site referenced in the email.

9. The system of claim 8, wherein determining the percentage of the content includes:
    determining a first percentage that represents an amount of the text disposed within the body of the email that has been viewed by the current recipient;
    determining a second percentage that represents an amount of the attachment of the email that has been viewed by the current recipient;
    determining a third percentage that represents an amount of the web site referenced in the email that has been viewed by the current recipient; and
    determining a fourth percentage that represents a combination of the first percentage, second percentage, and third percentage.

10. The system of claim 7, wherein the percentage of the content that has been viewed by the current recipient is displayed in an inbox that displays a plurality of emails.

11. The system of claim 10, wherein the inbox is sorted based on the percentage each of the plurality of emails has been viewed.

12. The system of claim 7, wherein the percentage of the content that has been viewed by the current recipient is graphically displayed.

13. A computer program product for processing an email comprising:
    a computer readable storage medium having program instructions embodied therewith, the program instructions executable by a processor to cause the processor to:
        determine types of content included in an email received by a current recipient from a previous recipient of the email, wherein the email includes a percentage of content of the email viewed by the previous recipient;
        monitor actions performed by the current recipient for each type of content of the email displayed to the current recipient mark sections of each type of content of the email viewed by the current recipient based on the monitoring;
        determine a percentage of content viewed by the current recipient based on the marked sections of each type of content of the email; and
        forward the email including markings of the sections of each type of content viewed by the current recipient and the percentage of the content viewed by the current recipient.

14. The computer program product of claim 13, wherein the types of content of the email include text disposed in a body of the email, an attachment of the email, and a web site referenced in the email.

15. The computer program product of claim 14, wherein determining the percentage of the content includes:
    determining a first percentage that represents an amount of the text disposed within the body of the email that has been viewed by the current recipient;

determining a second percentage that represents an amount of the attachment of the email that has been viewed by the current recipient;

determining a third percentage that represents an amount of the web site referenced in the email that has been viewed by the current recipient; and determining a fourth percentage that represents a combination of the first percentage, second percentage, and third percentage.

16. The computer program product of claim 13, wherein the percentage of the content that has been viewed by the current recipient is displayed in an inbox that displays a plurality of emails.

17. The computer program product of claim 13, wherein the percentage of the content that has been viewed by the current recipient is graphically displayed.

18. The computer program product of claim 16, wherein the inbox is sorted based on the percentage each of the plurality of emails has been viewed.

\* \* \* \* \*